Jan. 7, 1930.   H. M. SCHLEICHER   1,742,284
METHOD OF SEPARATING TIN COMPOUNDS FROM SOLUTIONS
Filed Nov. 6, 1925   2 Sheets-Sheet 2
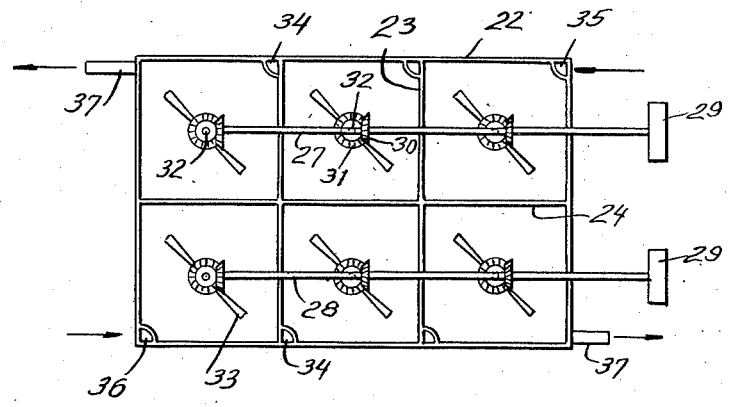
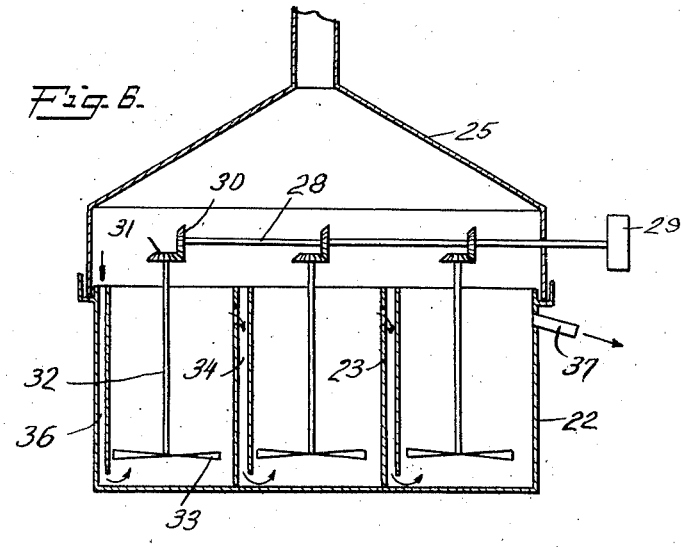
INVENTOR
Henry M. Schleicher
BY
Pennie Davis Marvin & Edmonds
his ATTORNEYS Patented Jan. 7, 1930

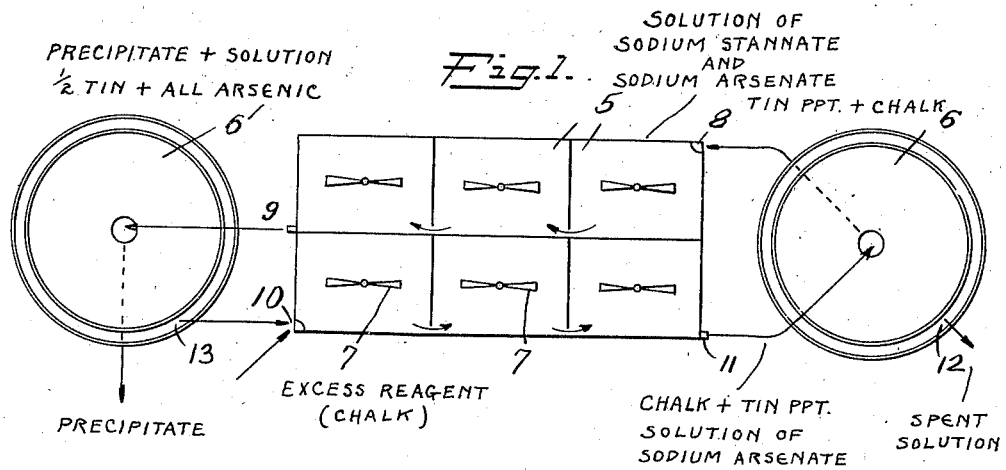
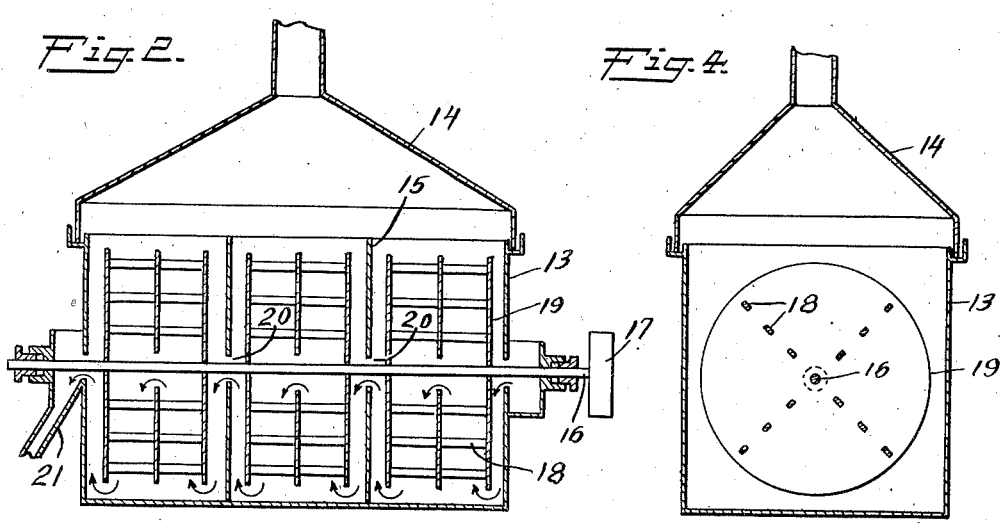
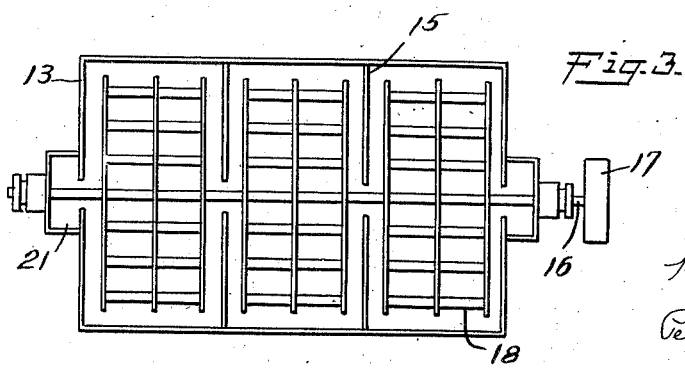

1,742,284

UNITED STATES PATENT OFFICE

HENRY M. SCHLEICHER, OF MONTEREY, MEXICO, ASSIGNOR TO AMERICAN METAL COMPANY, LTD., OF NEW YORK, N. Y., A CORPORATION OF NEW YORK

METHOD OF SEPARATING TIN COMPOUNDS FROM SOLUTIONS

Application filed November 6, 1925. Serial No. 67,224.

This invention relates to conducting chemical reactions and particularly to the separation of tin compounds from solutions.

In carrying out such reactions it is desirable frequently to precipitate the constituents of solutions selectively and this involves sometimes the careful proportioning of the added reagent to prevent either the precipitation of a second constituent or the inclusion of an excess of the reagent in the precipitate. In certain cases, for example, the addition of the minimum amount of the reagent to precipitate one constituent will actually cause precipitation of a proportion of another constituent. It may be possible to avoid this result by using an excess of the reagent with the result, however, that the precipitate will include some of this excess. Neither alternative is desirable.

It is the object of the present invention to provide a method of carrying out reactions of the character described in the separation of tin compounds from solutions whereby the desired precipitate can be obtained in substantial purity free from contaminating constituents of the solution treated and of the reagent.

Further objects and advantages of the invention will be apparent as it is better understood by reference to the following specification and accompanying drawing, in which Fig. 1 is a diagrammatic illustration of an apparatus adapted to be used in carrying out the process;

Fig. 2 is a longitudinal section through one type of agitating tank adapted to be used in the process;

Fig. 3 is a plan view thereof;

Fig. 4 is a transverse section through the agitating tank;

Fig. 5 is a horizontal section through another type of agitating tank; and

Fig. 6 is a vertical section through the structure illustrated in Fig. 5.

It is desirable in certain operations to precipitate tin from solutions containing sodium stannate and sodium arsenate. The tin can be precipitated by the addition of chalk (calcium carbonate) which may be added in the solid state or in suspension to the solution. Unfortunately if only so much chalk is added as is capable of precipitating all of the tin a certain amount of arsenic will also be precipitated and will contaminate the tin. It is desirable to avoid the presence of arsenic. This can be accomplished by the use of a large excess of chalk, but the precipitate will include this excess of chalk which is also undesirable.

I have discovered that the difficulty can be avoided by carrying out the reaction in two steps, the first involving the addition of only about one-half of the total amount of chalk required to precipitate the tin. The precipitate obtained by this part of the operation is free from arsenic because under the conditions of concentration of the tin and chalk the arsenic is prevented from separating from the solution. The precipitate containing only the tin is separated from the solution which is then treated in the second step with the full amount of chalk which would have been required to precipitate all of the tin originally in the solution. In other words, the excess of chalk is about equal to the amount actually required to separate the tin remaining in the solution. This excess of chalk prevents the precipitation of arsenic and the precipitate obtained contains all of the tin present in the solution mingled with the excess reagent. The solution which is now free from tin can be withdrawn from the process.

It will be seen that the precipitate obtained in the second stage contains about half the total amount of chalk required to precipitate the tin in a solution having the concentration of the solution originally treated. Consequently this mixture of chalk and tin can be used as the reagent in precipitating tin from a new batch of the solution and the precipitated tin will join that which has already separated with the chalk leaving a solution containing approximately half of the tin with the arsenic. This solution is then treated with an excess of chalk as before to again obtain a mixture containing the tin with the reagent, thus completing the second cycle of operation. This cycle can be carried on indefinitely by introducing the fresh solution and the reagent at the proper points and will result in a solution free from tin and containing all of the arsenic and a precipitate containing all of the tin and free from arsenic.

The proportions of the reagent to be added in the two steps of the process are preferably as indicated, but variation from these proportions is permissible. Thus, if less than half of the reagent is added in the first step more than half will be added in the second step and likewise the addition of more than half of the reagent in the first step will require a corresponding reduction in the amount added in the second step. It is necessary only to so proportion the amount of reagent added in the first step that the undesirable constituents of the solution are not precipitated thereby.

In carrying out the invention an apparatus such as that indicated in Fig. 1 is employed preferably. It comprises a plurality of boxes 5 of suitable construction to hold the solutions, the boxes being separate except for inlets and outlets permitting the flow of the solutions therethrough. If the reaction requires the application of heat the solutions may be heated before they are introduced and the boxes may be suitably insulated. Otherwise it may be necessary to mount the boxes in a suitable furnace to permit the application of heat thereto or heating coils supplied by steam or other heating medium may be utilized therein. As indicated, the boxes are arranged in two series of three each so that one solution flows in one direction while the other flows in the opposite direction through the separate series. At the opposite ends of the apparatus suitable separators are provided to permit the withdrawal of the liquid from the precipitate. The well known Dorr thickener indicated at 6 is adapted for such use but other separating devices may be employed. The boxes 5 are provided with suitable stirring devices 7 to maintain an active agitation of the contents. The fresh solution is introduced at 8 and flows successively through the boxes on one side of the apparatus, being discharged at an overflow 9 at the opposite end of that series. It is conveyed to the thickener 6 which is of the usual construction and is there permitted to settle, the finished precipitate being withdrawn from the bottom of the apparatus as is usual in thickening operations. If a filter is substituted the precipitate would remain in the filter after the solution had been removed. The solution from which approximately half the desired constituent has been separated by the first step of the operation escapes from the thickener through an overflow 13 and is delivered at 10 to the first of the second series of boxes 5. At this point the fresh reagent either as a solid or in suspension in a suitable liquid is introduced and mingled with the solution from the thickener. The mixture continues through the series of boxes and escapes through an overflow 11 through the second thickener 6 or the equivalent filter. In the thickener the precipitate which includes all of the desired constituent of the solution together with the excess of reagent is withdrawn through the bottom and is delivered at the inlet 8 with the fresh solution to the other series of boxes. The solution from which the desired constituent has been separated escapes through an overflow 12 from the thickener. Thus it will be seen that one of the thickeners discharges the finished precipitate which may be treated thereafter in any desired manner for the further purification or recovery of the desired constituent while the other thickener discharges the solution freed from the desired constituent. This solution can be treated thereafter for the recovery of any constituents remaining therein. In case tin is separated from a solution containing sodium stannate and sodium arsenate, in the first series of boxes approximately one half of the tin content of the solution will separate and the precipitate containing only the tin will be withdrawn from the thickener, leaving the solution containing the remainder of the tin and the arsenic to be treated with the excess of fresh reagent, i. e., chalk, in the second series of boxes. The precipitate obtained therein will include the remainder of the tin free from arsenic and the excess of chalk, and this is separated in the second thickener and added at the inlet 8 to the apparatus where it is mingled with the fresh solution.

It is essential that the solution be thoroughly agitated during the precipitation and also that all of the solution remain in the individual boxes for a sufficient time to ensure a thorough reaction. A preferred form of the boxes is illustrated in Figs. 2 to 4 of the drawing, in which a shell 13 is provided with a cover 14 and is separated by partitions 15 into a plurality of compartments constituting the separate boxes. A shaft 16 extends through the compartments and is adapted to be driven through a pulley 17, for example, from a suitable source of power. Paddles 18 are mounted at intervals on the shaft to operate in each of the compartments, the paddles being provided with discs 19 at their opposite sides to ensure the passage of the liquid through the compartments in succession as indicated by the arrows therein. The discs prevent the solution from passing directly through the several compartments which are connected by openings 20 and thus ensure proper conduct of the reaction. An overflow 21 permits the escape of the solution after passing through the several compartments. It will be understood that there are two sets of compartments as hereinbefore indicated, each having a shaft and an agitating means to accomplish the purpose of the invention.

In Figs. 5 and 6 another form of the apparatus is illustrated comprising a shell 22 divided by partitions 23 and 24 and having a cover 25. Shafts 27 and 28 extend longitudinally over the compartments and are provided with pulleys 29 whereby they may be rotated by the application of power from any suitable source. The shafts 27 and 28 carry bevel pinions 30 which mesh with corresponding gears 31 on a plurality of vertical shafts 32. The latter are supported in the respective compartments and are provided with propellers 33 which being rotated cause a constant agitation of the solution. The several compartments are connected by semi-cylindrical overflow pipes 34 which introduce the liquid overflowing from each compartment into the succeeding compartment at the bottom thereof. The solution is introduced to similar devices 35 and 36 which deliver the solutions and reagents at the bottom of the first compartment of each series. The last compartment of each series is provided with an overflow 37 through which the mixture of solution and precipitate escape to the respective thickener. By the arrangement described movement of the solutions and precipitates through the apparatus is carried out in such a way as to ensure thorough agitation thereof and the maintenance of the reacting materials for a sufficient period in each of the compartments.

One of the advantages of the process as described is the possibility of carrying out the operation continuously to produce the desired precipitate. The major advantage, however, is the possibility of securing the precipitate substantially free from contaminating ingredients derived either from the solution or from the reagent. It is possible by the application of the invention to conduct the separation of constitutents from solutions in a rapid and effective manner, thus permitting the commercial production of various materials more cheaply than has been possible heretofore.

Various changes may be made in the details of operation as herein indicated and in the apparatus used therefor without departing from the invention or sacrificing any of the advantages thereof.

I claim:

1. The method of separating tin compounds from solutions involving the addition of a reagent to the solution to precipitate the tin compound, which comprises adding the reagent in successive steps with intermediate separation of the precipitate, the quantity of reagent used in the first step being less than the theoretical quantity required to precipitate all of the tin compound and the quantity of reagent used in the second step being in excess of the theoretical quantity required to precipitate the remainder of the tin compound, and utilizing the precipitate from the second step as the reagent in the first step of the method.

2. The method of separating tin compounds from solutions involving the addition of a reagent to the solution to precipitate the tin compound, which comprises adding the reagent in successive steps with intermediate separation of the precipitate, the quantity of the reagent used in the first step being approximately half the theoretical quantity required to precipitate all of the tin compound and the quantity of the reagent used in the second step being approximately the theoretical quantity required to precipitate all of the tin compound.

3. The method of separating tin compounds from solutions involving the addition of the reagent to the solution to precipitate the tin compound, which comprises adding the reagent in successive steps with intermediate separation of the precipitate, the quantity of reagent used in the first step being approximately half the theoretical quantity required to precipitate all of the tin compound and the quantity of reagent used in the second step being approximately the theoretical quantity required to precipitate all of the tin compound, and utilizing the precipitate from the second step as the reagent in the first step of the method.

4. The method of separating tin compounds from solutions involving the addition of a reagent to the solution to precipitate the tin compound, which comprises adding a portion only of the reagent required to precipitate all of the tin compound, separating the precipitate, adding to the solution a quantity of the reagent sufficient to precipitate all of the tin compound in the original solution, separating the precipitate from the second step and utilizing it as the reagent in the first step of the method.

5. The method of separating tin compounds from solutions involving the addition of a reagent to the solution to precipitate the tin compound, which comprises adding approximately half of the reagent required to precipitate all of the tin compound, separating the precipitate and adding to the solution a quantity of the reagent sufficient to precipitate all of the tin compound in the original solution.

6. The method of separating tin compounds from solutions involving the addition of a reagent to the solution to precipitate the tin compound, which comprises adding approximately half of the reagent required to precipitate all of the tin compound, separating the precipitate, adding to the solution a quantity of the reagent sufficient to precipitate all of the tin compound in the original solution, separating the precipitate from the second step and utilizing it as the reagent in the first step of the method.

7. The method of separating tin compounds from solutions involving the addition of a reagent to the solution to precipitate the tin compound, which comprises precipitating and removing a portion of the tin compound, adding to the solution a sufficient excess of the reagent to avoid separation of impurities therefrom, separating the precipitate from the second step and utilizing it as the reagent in the first step of the method.

In testimony whereof I affix my signature.

HENRY M. SCHLEICHER.